United States Patent [19]

Chuo

[11] Patent Number: 5,764,507
[45] Date of Patent: Jun. 9, 1998

[54] PROGRAMMABLE CONTROLLER WITH PERSONAL COMPUTERIZED LADDER DIAGRAM

[76] Inventor: Po-Chou Chuo, No. 389, Chung Cheng Road, Tien Chung Chen, Chang Hua Hsien, Taiwan

[21] Appl. No.: 581,934

[22] Filed: Jan. 2, 1996

[51] Int. Cl.[6] .................................................. G05B 11/01
[52] U.S. Cl. ..................... 364/147; 364/148; 364/188; 364/140; 364/141; 364/146; 364/179; 364/507; 364/578; 395/673; 395/825; 395/737
[58] Field of Search ............................ 364/147, 148, 364/188, 140, 141, 146, 179, 507, 578; 395/673, 825, 737

[56] References Cited

U.S. PATENT DOCUMENTS

| | | | |
|---|---|---|---|
| 4,442,504 | 4/1984 | Dummermuth et al. | 395/737 |
| 4,449,180 | 5/1984 | Ohshima et al. | 364/147 |
| 4,542,452 | 9/1985 | Fukai et al. | 364/141 |
| 4,570,217 | 2/1986 | Allen et al. | 364/188 |
| 4,803,639 | 2/1989 | Steele et al. | 364/507 |
| 4,941,081 | 7/1990 | Kumar et al. | 364/140 |
| 4,954,980 | 9/1990 | Yamauchi | 364/179 |
| 4,972,365 | 11/1990 | Dodds et al. | 395/825 |
| 5,113,359 | 5/1992 | Kiya et al. | 364/578 |
| 5,142,469 | 8/1992 | Weisenborn | 364/146 |
| 5,193,189 | 3/1993 | Flood et al. | 395/673 |
| 5,225,947 | 7/1993 | Mathews et al. | 364/140 |
| 5,285,376 | 2/1994 | Struger et al. | 364/147 |
| 5,586,335 | 12/1996 | Utan | 364/147 |

*Primary Examiner*—Reba I. Elmore
*Assistant Examiner*—McDieunel Marc
*Attorney, Agent, or Firm*—Beveridge, DeGrandi, Weilacher & Young, LLP

[57] ABSTRACT

A programmable logic controller with personal computerized ladder diagram having a keyboard, a monitor, a magnetic disk unit, a printer, the output and input terminals, an interface card of temporary storage data display, a magnetic disk control card, an input/output communication interface, a printer driving interface, an input/output process control card of a latch register, a CPU, a RAM-1, a RAM-2, a ROM, a ladder diagram editing module, a ladder program translation module, an instruction algorithm control module and a hardware setting integrated module. The processes include reading an executing instruction, setting an address for a control card, initiating an output/input model, storing control parameters, operating a ladder control operation with an editor, pre-storing data of the ladder control operation, proceeding a ladder control design, storing a ladder diagram program in the RAM-2 through an element editing program, storing the ladder diagram program, and printing the ladder diagram program are established.

4 Claims, 20 Drawing Sheets

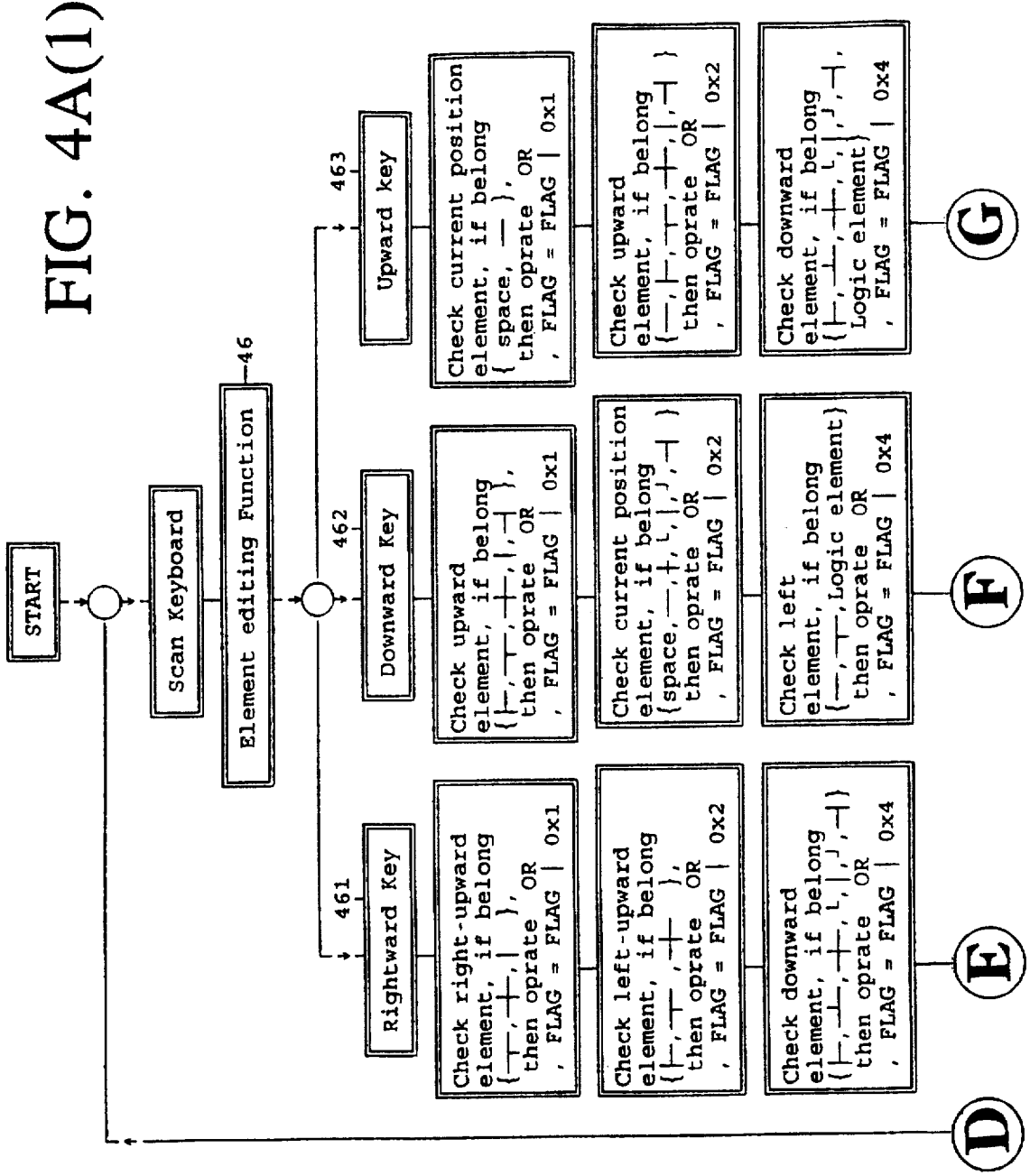
FIG. 4A(1)

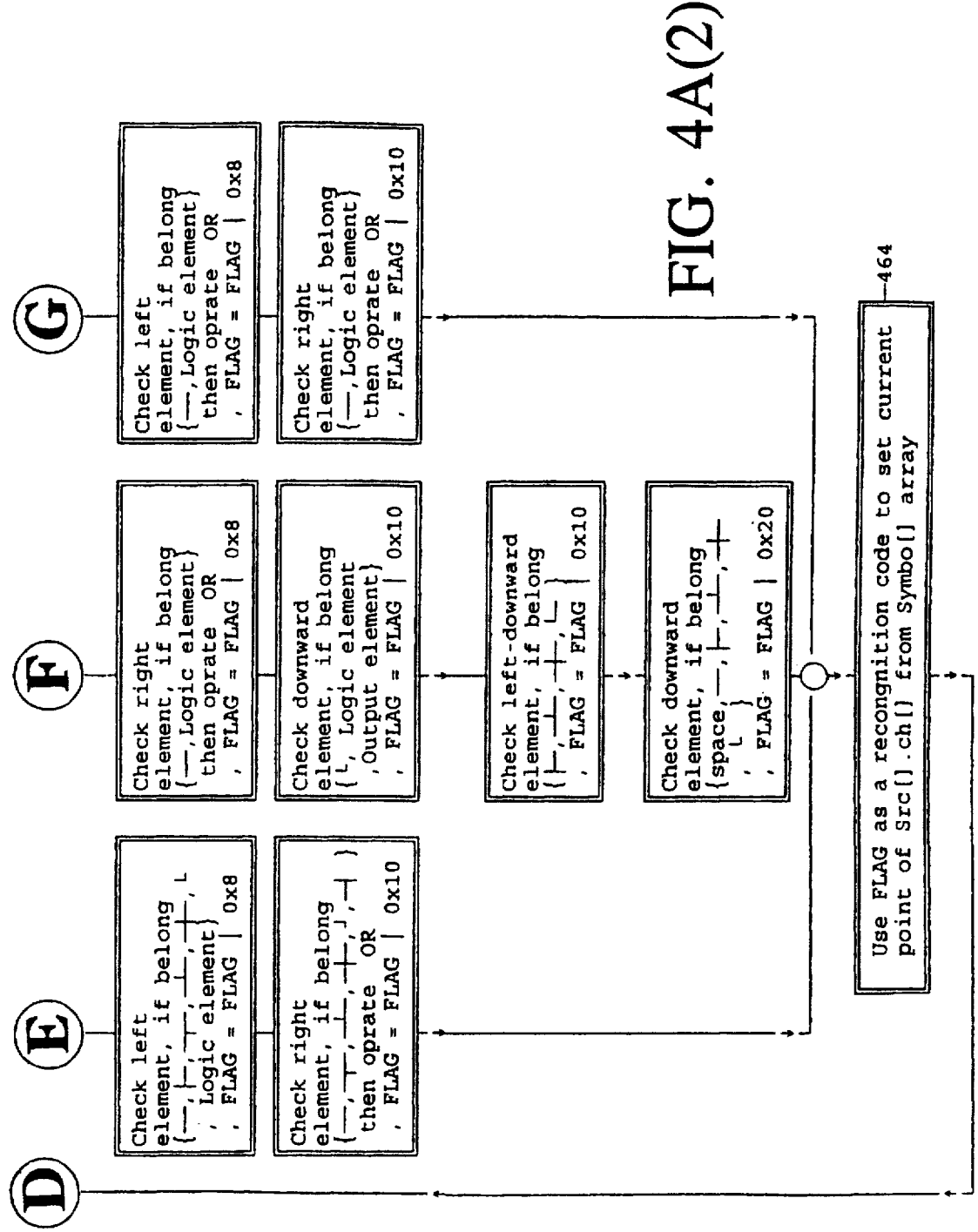
FIG. 4A(2)

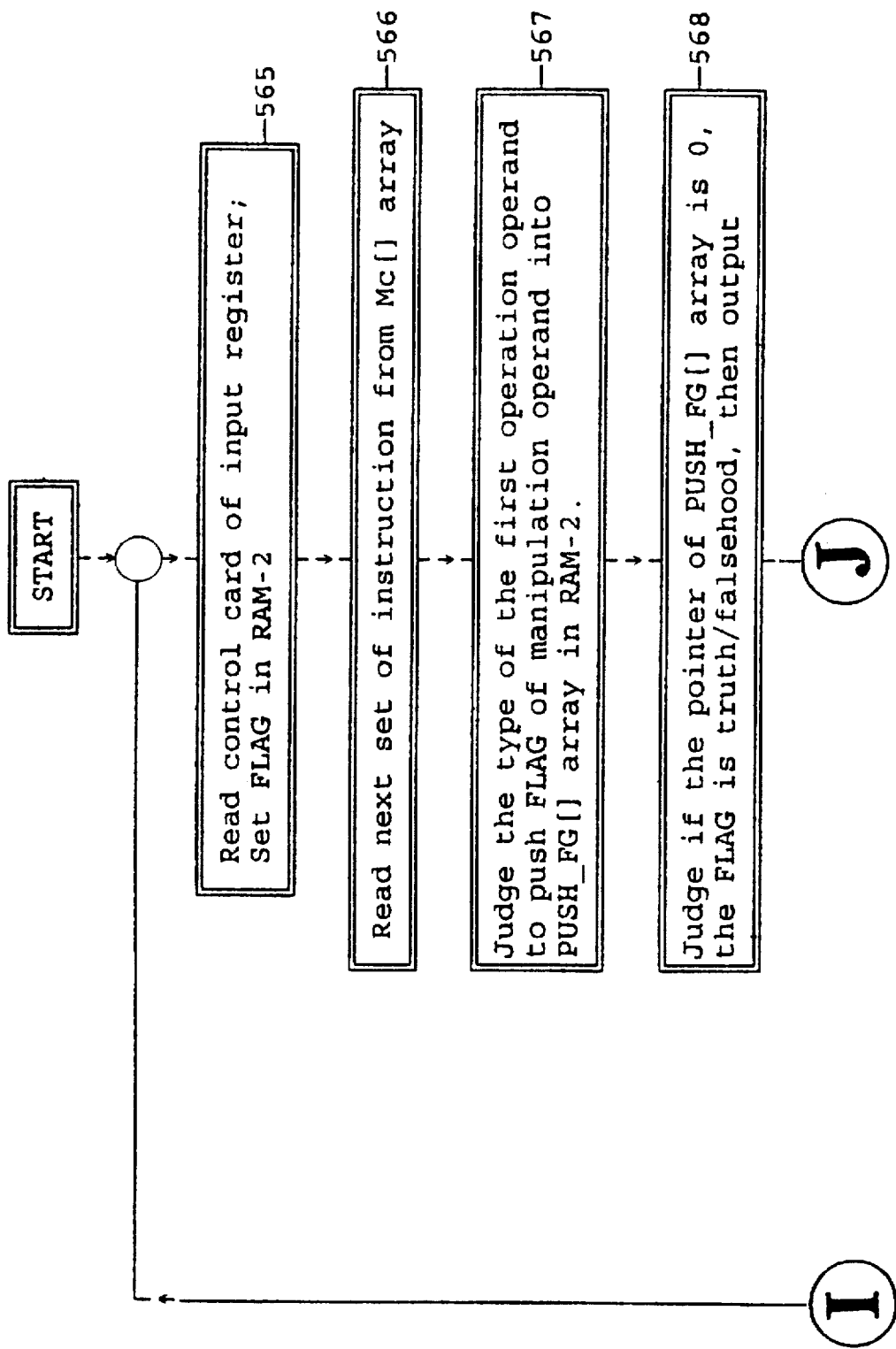
FIG. 5B(1)

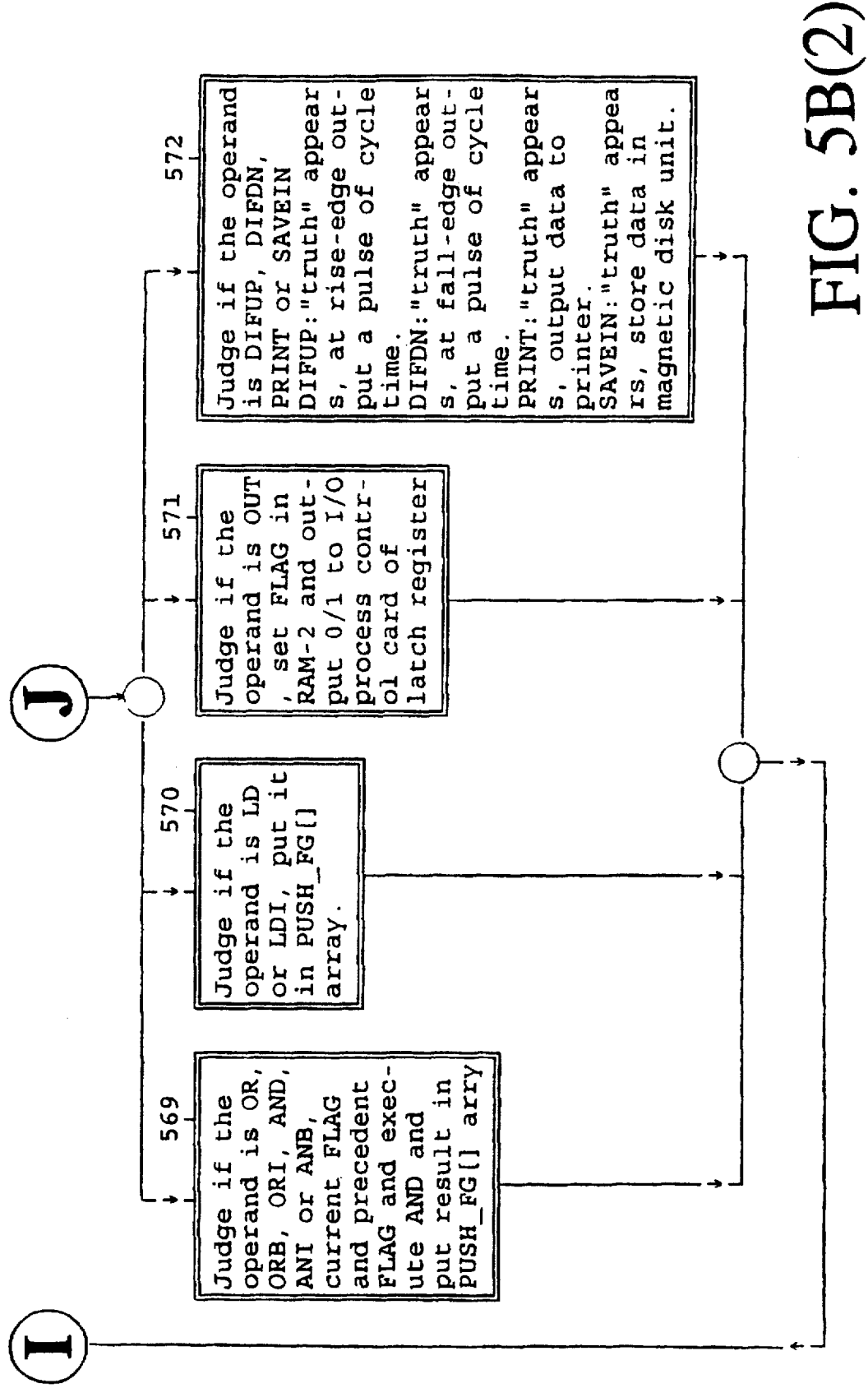
FIG. 5B(2)

```
| File | fUncCard | I/O_Chl. | rEcord | ScrMap | Ladder | Run |
```

PC FactoryCntrol-Series Program Logic Controller (PCPLC) Ver 1.0

```
                    Digital Input Address Map Chl.
                    h.0207:0x226   Ch.0300-Ch.0307:0x200
                    h.0217:0x227   Ch.0310-Ch.0317:0x200
                    h.0227:0x240   Ch.0320-Ch.0327:0x200
                    h.0237:0x200   Ch.0330-Ch.0337:0x200
PLC Module                         Ch.0340-Ch.0347:0x200
PCL-830                            Ch.0350-Ch.0357:0x200
PCL-812                            Ch.0360-Ch.0367:0x200
NI MIO-16                          Ch.0370-Ch.0377:0x200
OtherType
Ch.0240-Ch.0247:0x200
Ch.0250-Ch.0257:0x200
Ch.0260-Ch.0267:0x200
Ch.0270-Ch.0277:0x200
       Ctrl_LEFT/RIGHT  LEFT/RIGHT: Modify Address
```

```
Load File:loop1    CardType:PCL-812    BaseAddr:220H
Save File:loop1
```

Modify Every DI/DO Port Start Address, 1 Port =8 Channels

PROGRAMMABLE CONTROLLER WITH PERSONAL COMPUTERIZED LADDER DIAGRAM

BACKGROUND OF THE INVENTION

The present invention relates to a programmable logic controller (PLC) with personal computerized ladder diagram to replace high level computer languages without special writing machines.

A traditional programmable logic controller does not have the functions of real-time data file storage, monitor controlling on the screen and run-time printing. An improved programmable logic controller has a plasma type monitor. Different manufacturers have their own modes of communication and various editing programs with special writing machines. However, the improved programmable logic controller does not have the functions of real-time data file storage and run-time printing. An improved programmable logic controller must connect a personal computer in order to occupy the functions of real-time data file storage and run-time printing. The persons who are familiar with the programmable logic controller may not be familiar with the high level computer languages such as BASIC, PASCAL, C and ASSEMBLY languages. Without the programmable logic controller, the personal computer cannot execute the functions of the programmable logic controller at all.

SUMMARY OF THE INVENTION

An object of the present invention is to provide a programmable logic controller with personal computerized ladder diagram to replace high level computer languages such as BASIC, PASCAL, C and ASSEMBLY languages.

Another object of the present invention is to provide a programmable logic controller with personal computerized ladder diagram without using special writing machines to write traditional PLC programs.

Another object of the present invention is to provide a programmable logic controller with personal computerized ladder diagram which has a control card to input logic information and a driving interface card to input analog information.

Another object of the present invention is to provide a programmable logic controller with personal computerized ladder diagram which can monitor in/out status on the screen.

Another object of the present invention is to provide a programmable controller with personal computerized ladder diagram which has an optoelectronic coupling array circuit to lock an input signal in an input/output register control card and a coupling circuit to lock an output signal in an input/output register control card.

BRIEF DESCRIPTION OF THE DRAWINGS

FIG. 4A is a flow chart showing the control element editing function;

FIG. 5B is a flow chart showing the push-pop algorithm control steps;

FIG. 6B is a schematic view showing I/O address setting and selecting interface card of programmable translation module;

FIG. 8A shows the view of I/O run-time status and debugging environment in the ladder program execution.

DETAILED DESCRIPTION OF THE INVENTION

Figure 1:
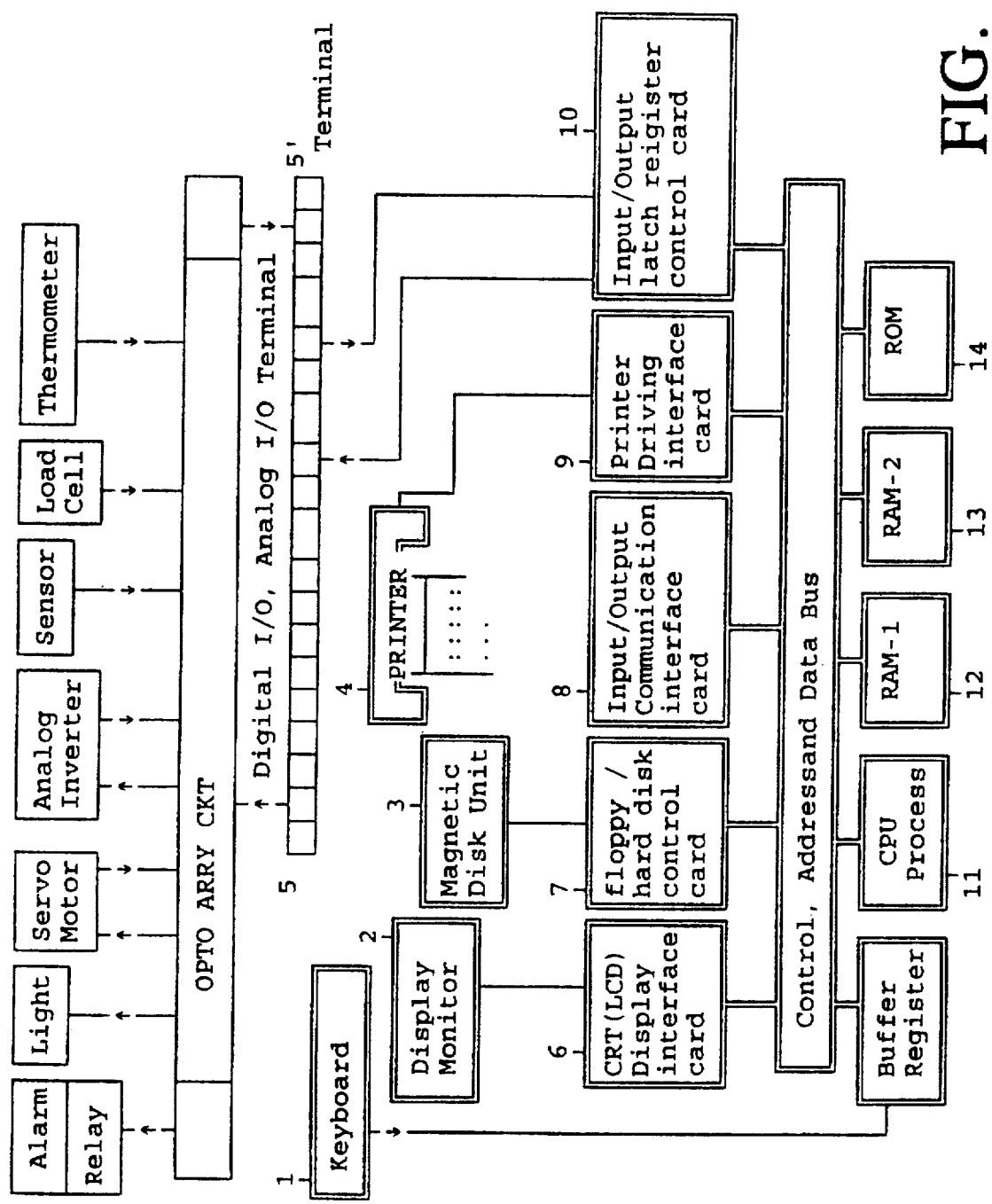
FIG. 1 is a block diagram illustrating the system of the present invention.
Figure 7:
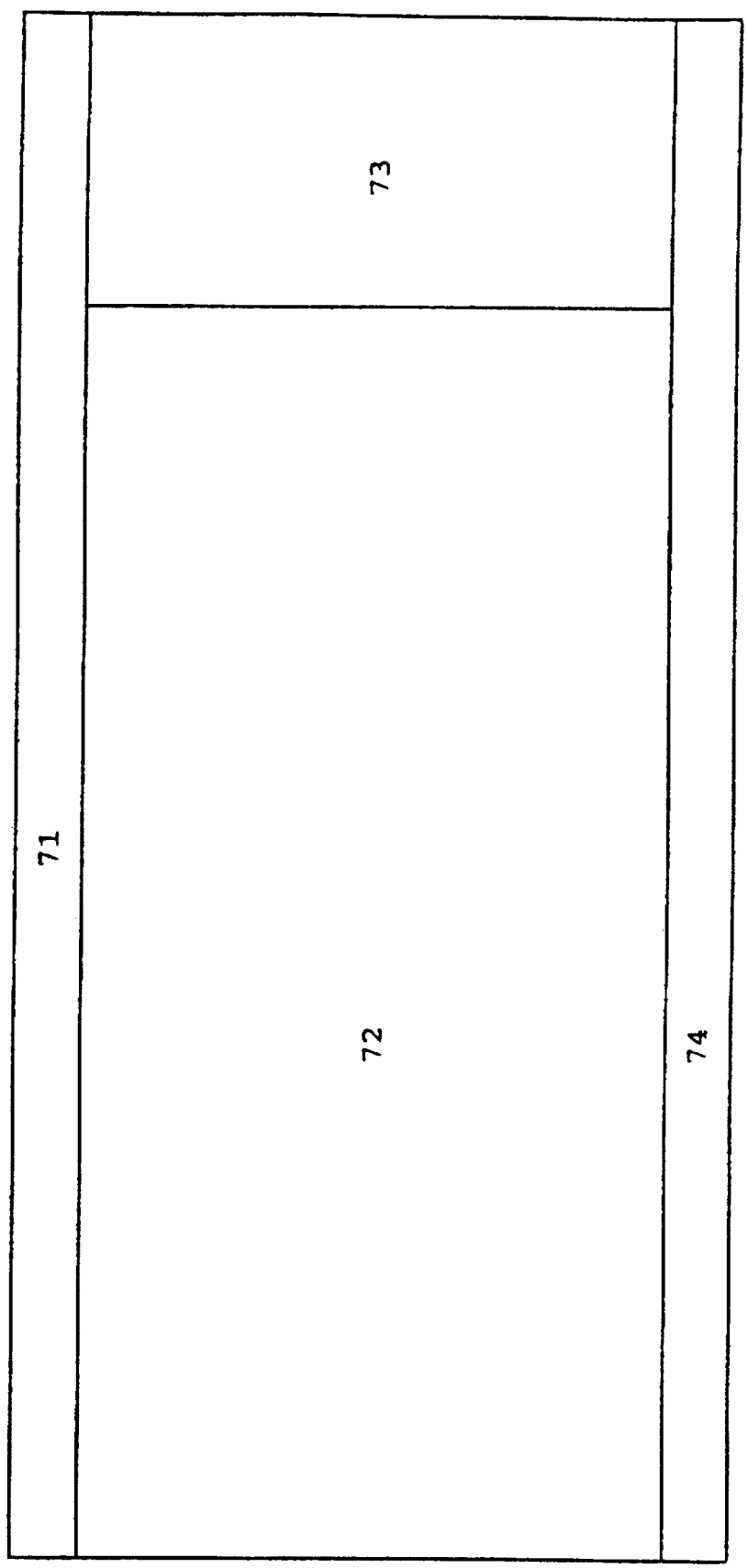
FIG. 7 is a block diagram illustrating ladder control operation.

Referring to FIG. 1, a block diagram of the system structure of the present invention is illustrated. The structure of the system comprises a keyboard 1, a display monitor 2, a magnetic disk unit (which includes a floppy disk and a hard disk) 3, a printer 4, an output terminal 5, an input terminal 5', an interface card of temporary storage data display 6, a floppy disk/hard disk control card 7, an input/output communication interface 8, a printer driving interface 9, an input/output process control card of latch register 10, a CPU (central processing unit) 11, a RAM-1 (random access memory of storing executive module) 12, a RAM-2 (random access memory of storing operation variables) 13 and a ROM (read only memory) 14. The ladder operation procedure can be classified as an editing module (as shown in FIG. 7), translation module (as shown in FIG. 5A) and instruction algorithm control module (as shown in FIG. 5B). The input terminal 5' of the input/output process control card of latch register 10 connects electronic signal elements with switch state such as access switch and pressure valve or analog electronic signal elements such as load cell and thermometer through an OPTO ARRAY CKT (optoelectronic coupling array circuit). The output terminal 5 of the input/output process control card of latch register 10 connects relays, coupling power circuit or analog signal control devices such as servomotor, frequency converter and electric light through the OPTO ARRAY CKT (optoelectronic coupling array circuit). The data of editing module and translation module are pre-stored in the magnetic disk unit 3 or programmed in ROM 14 so that the user can edit the ladder diagram and translating the ladder program into instruction algorithm. The structure of the system provides the functions of edition, translation, execution, control, input/output, printing, display monitoring and run-time file storage on the control points.

Figure 2:
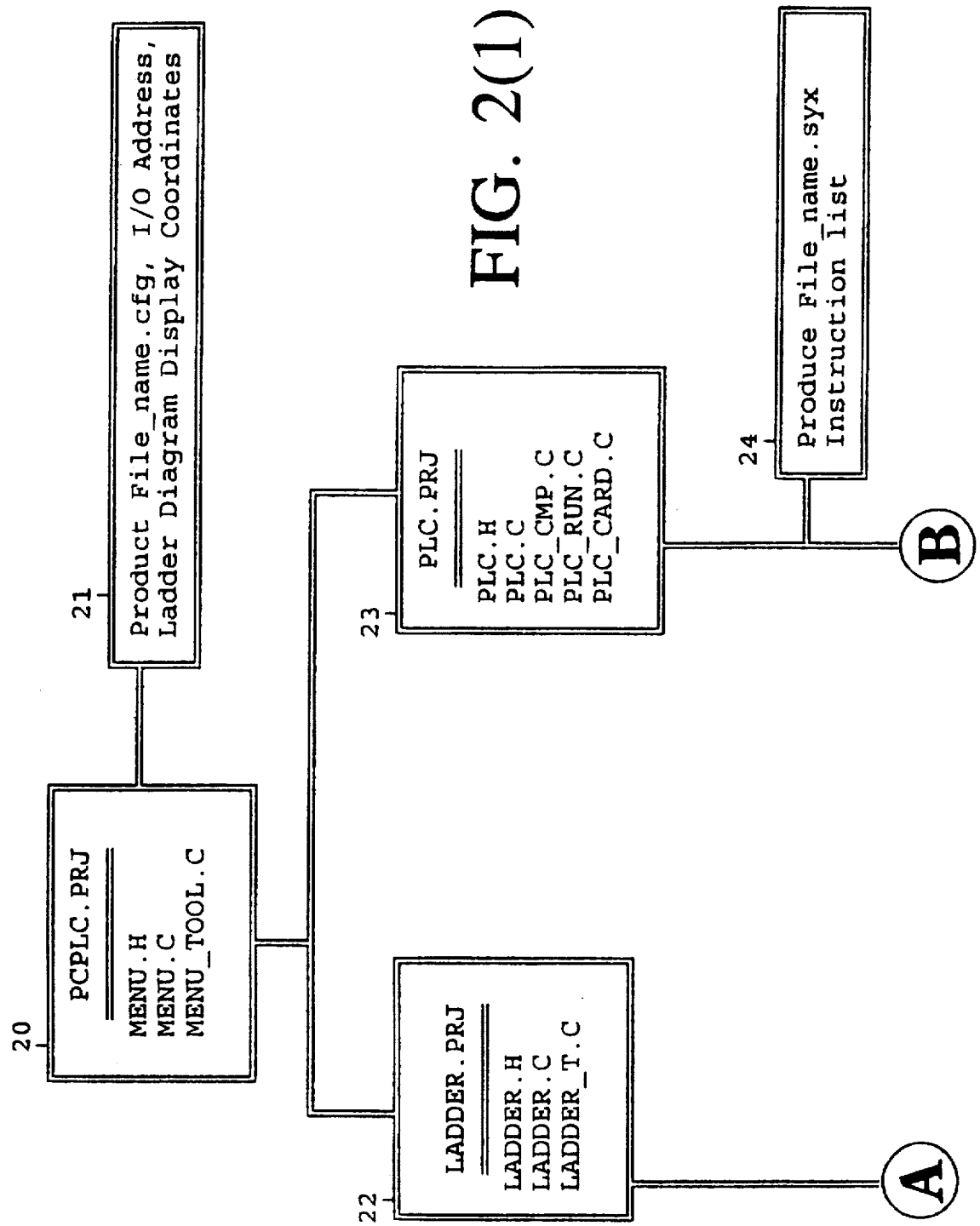
FIG. 2 is a block diagram of a main structure system of the present invention.
Figure 2:
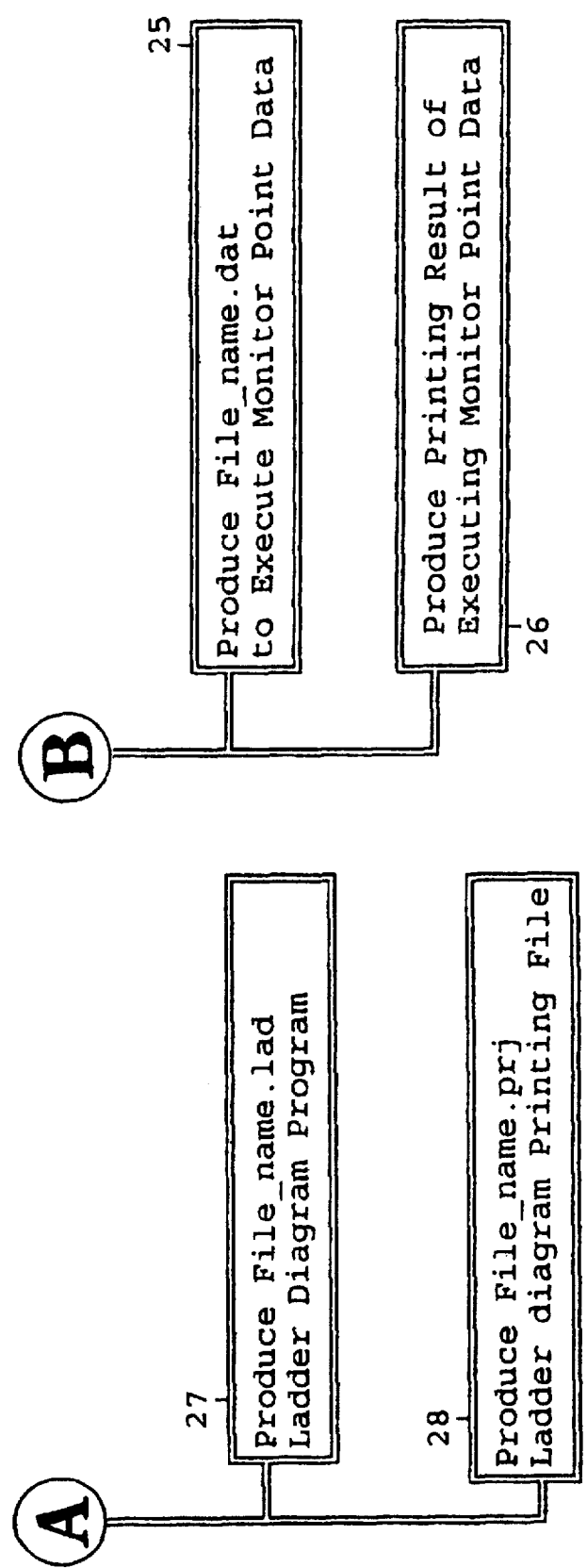
Figure 8:
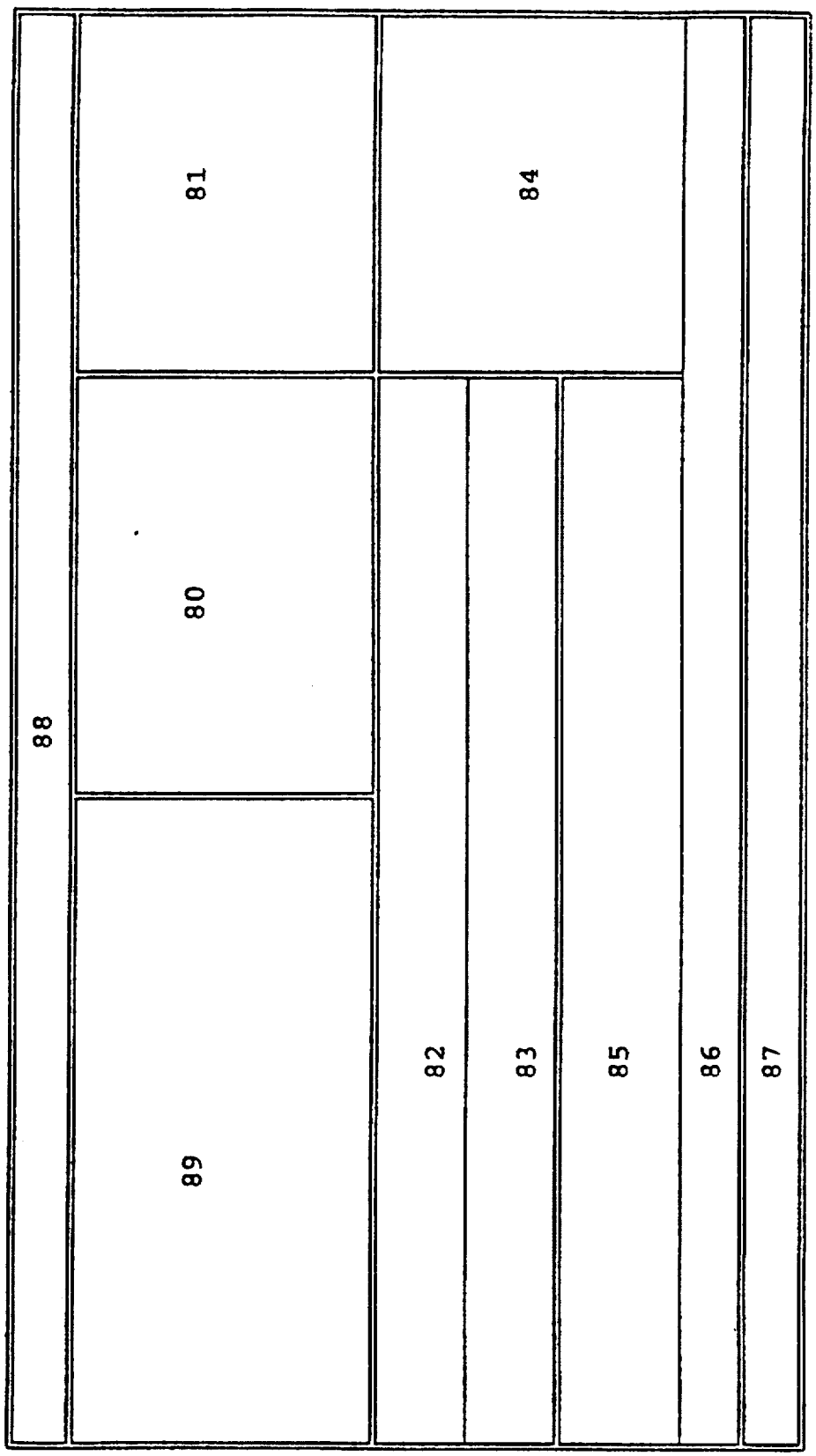
FIG. 8 is a block diagram illustrating the editing chart of the ladder control operation procedure on the screen.

FIG. 2 shows the main structure system of the present invention. The function modules of the system comprises hardware setting integrated functions 20 and 21, a ladder diagram editing function 22, and a ladder program translation and PLC control function 23. The hardware setting integrated function 20 is the integrated window for setting hardware environment and executing PLC, or editing ladder diagram. After executing the hardware setting integrated function 20, the setting parameters will produce a parameter file 21 to be used by the ladder diagram editing function 22 and the ladder program translation and PLC control function 23. The ladder diagram editing function 22 can produce an edition file for the ladder diagram translation and PLC control function 23. The ladder program translation and PLC control function 23 sets a file to produce the monitoring point data of I/O status 25 to show a display monitor environment (as shown in FIG. 8). Therefore, the printer can print the ladder diagram and the data of the monitor points 26 and 28 directly. The magnetic disk unit can store the files in real time also. Thus the ladder program translation and PLC control function 23 can perform as driving programs for various hardware interface cards so that other programmable controllers, remote control modules and interface cards can be added to the system by modifying the programmable controllers, remote control modules and interface cards slightly. Therefore, the present system is open and compatible with other programmable controllers, remote control modules and interface cards.

Figure 3:
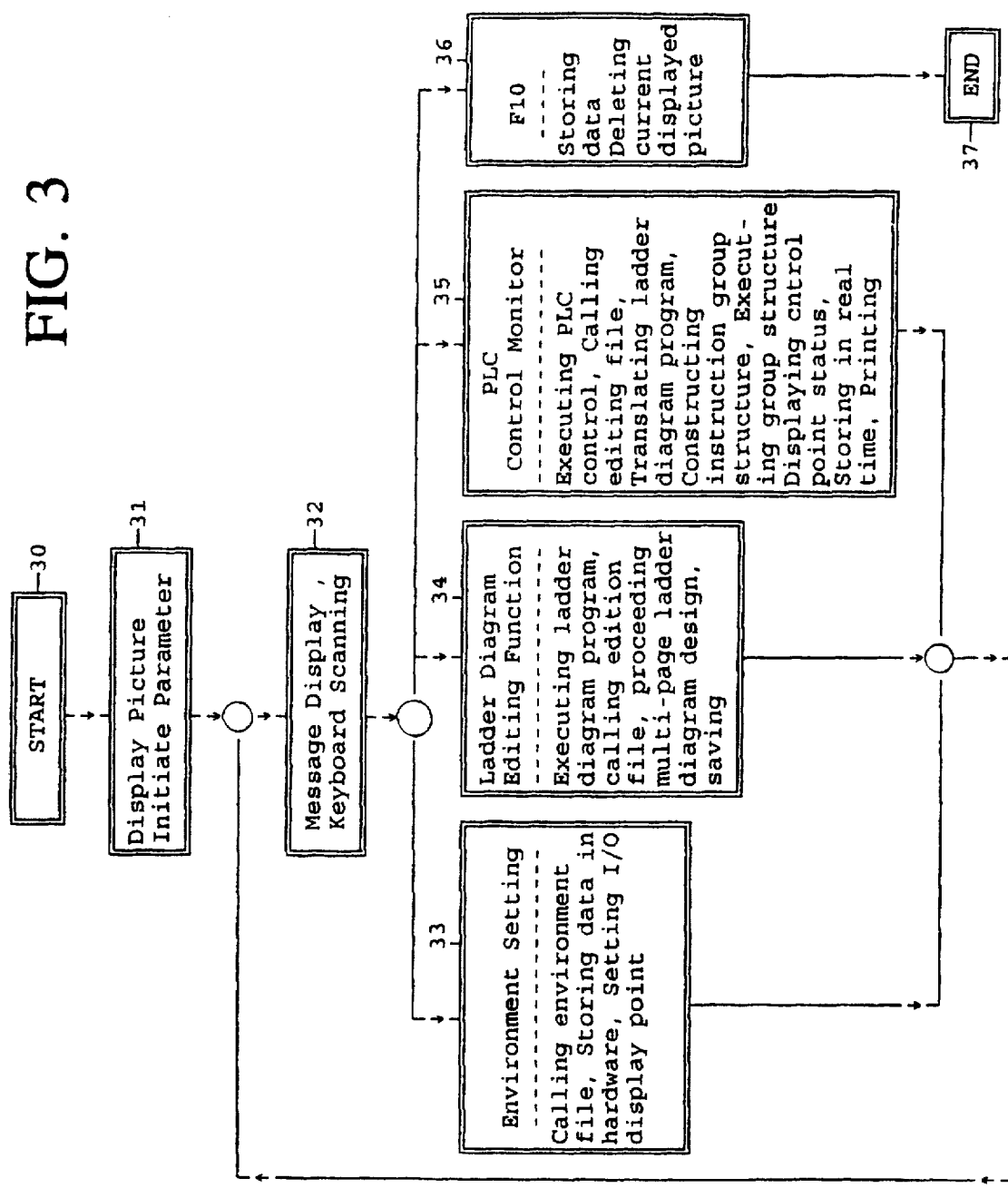
FIG. 3 is a block diagram illustrating the integrated functions of the hardware parameter setting of the present invention.

FIG. 3 is a block diagram illustrating the integrated functions of the hardware parameter setting of the present invention. The block diagram begins from the entrance point 30, goes to the displayed picture and parameter initiation 31, goes to message display and keyboard scanning 32, and then goes to one of the four steps, namely, environment setting 33, ladder diagram editing function 34, PLC program control monitor 35 and storing or deleting display 36.

Figure 4:
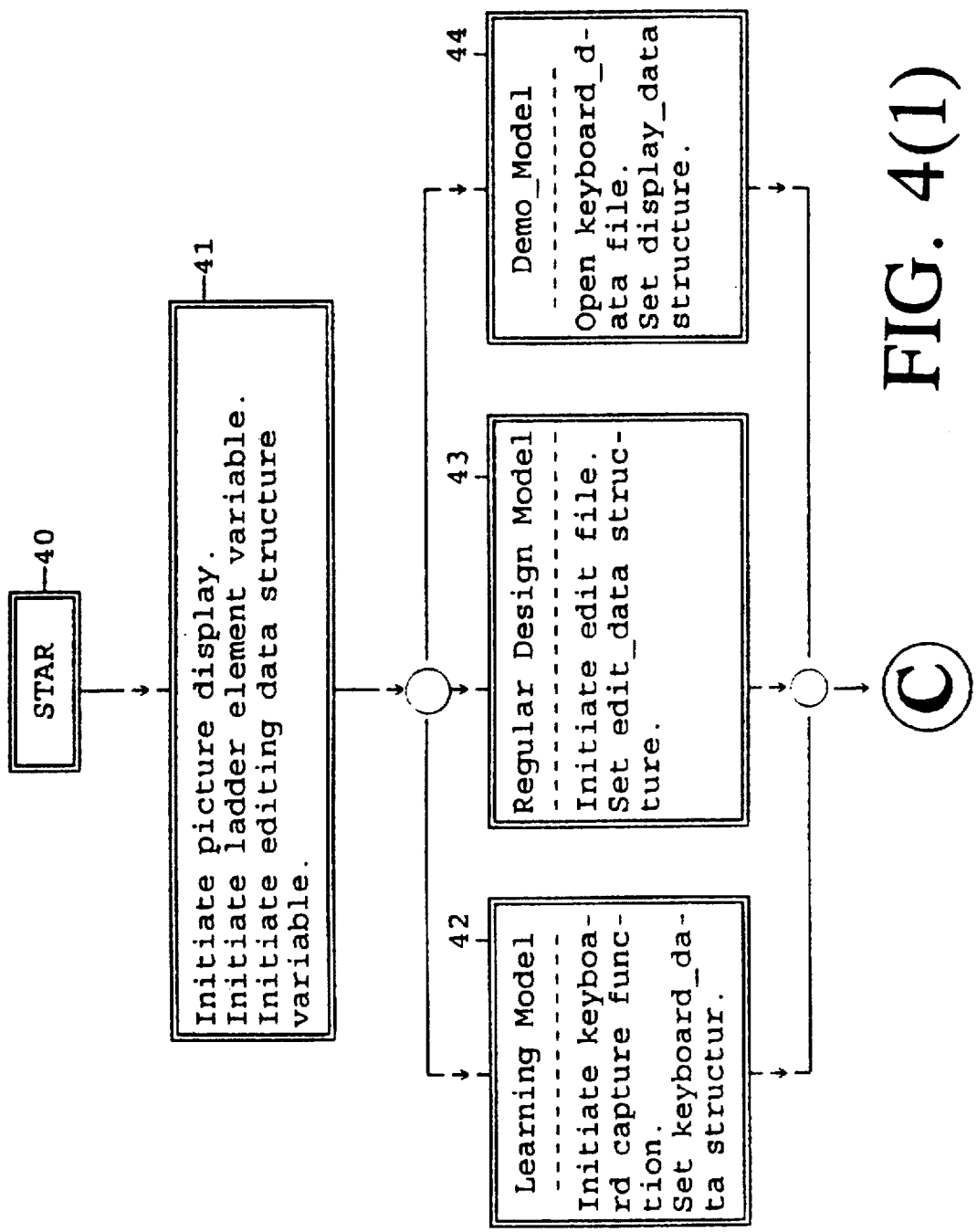
FIG. 4 is a flow chart showing the editing steps of the ladder diagram.
Figure 4:
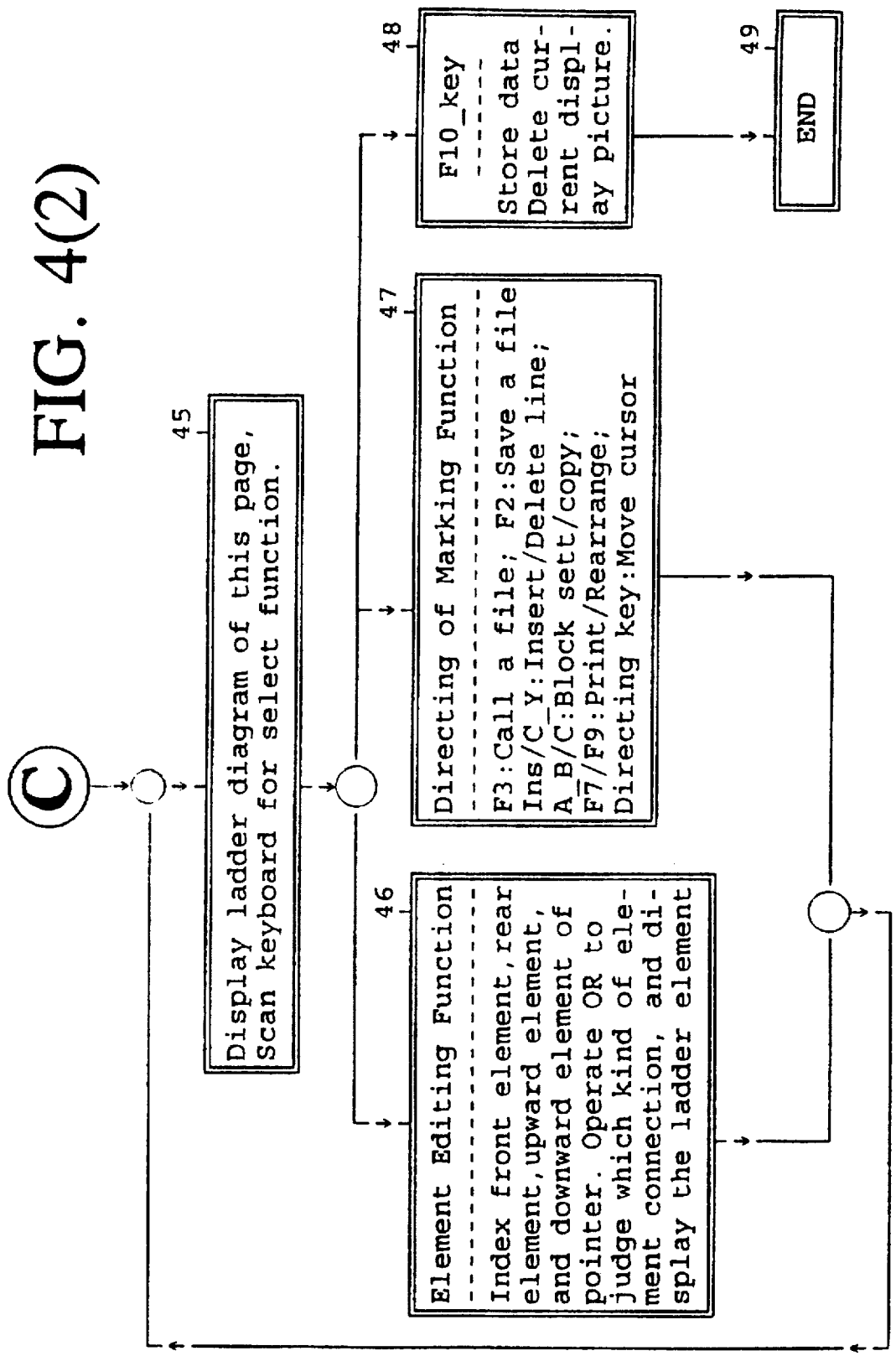

FIG. 4 is a flow chart showing the editing steps of the ladder diagram. The flow chart begins from the entrance point 40, goes to judging initial data structure and initializing picture display and ladder element function 41, then goes to one of the three steps, namely, learning model 42, regular design model 43 and demonstration model 44, then goes to displaying ladder diagram of this page and scanning keyboard for selecting function 45, and then goes to one of the three steps, namely, element editing function 46, directing and marking function 47 and ending function 48. The learning model 42 records the design process of the user in the other file which can be displayed in the demonstration model 44. The directing and marking function 47 can store files, fetch files, print, delete, insert, copy and move the position. The ending function 48 can delete the current display and return to the precedent program.

FIG. 4A is a flow chart showing the element editing function. The element editing function 46 has normal open (-⊢⊢-), normal close (-⊬-) and DASH (-). The DASH function is operated by OR algorithm to connect two adjacent elements and to arrange the cursor position on the connecting elements (such as —, ⊥, T, ⊢, +, ⊣, L, and ⌐). There are three keys after the step of element editing function 46, namely, rightward key 461, downward key 462 and upward key 463 to execute editing elements, connecting two adjacent elements or blank a space, and operating OR algorithm in order to edit the ladder diagram. The setting of variables is using FLAG as a recognition code to index the element of database Symbol[] array 464 to set marked edition structure Src[].ch[].

Figure 5:
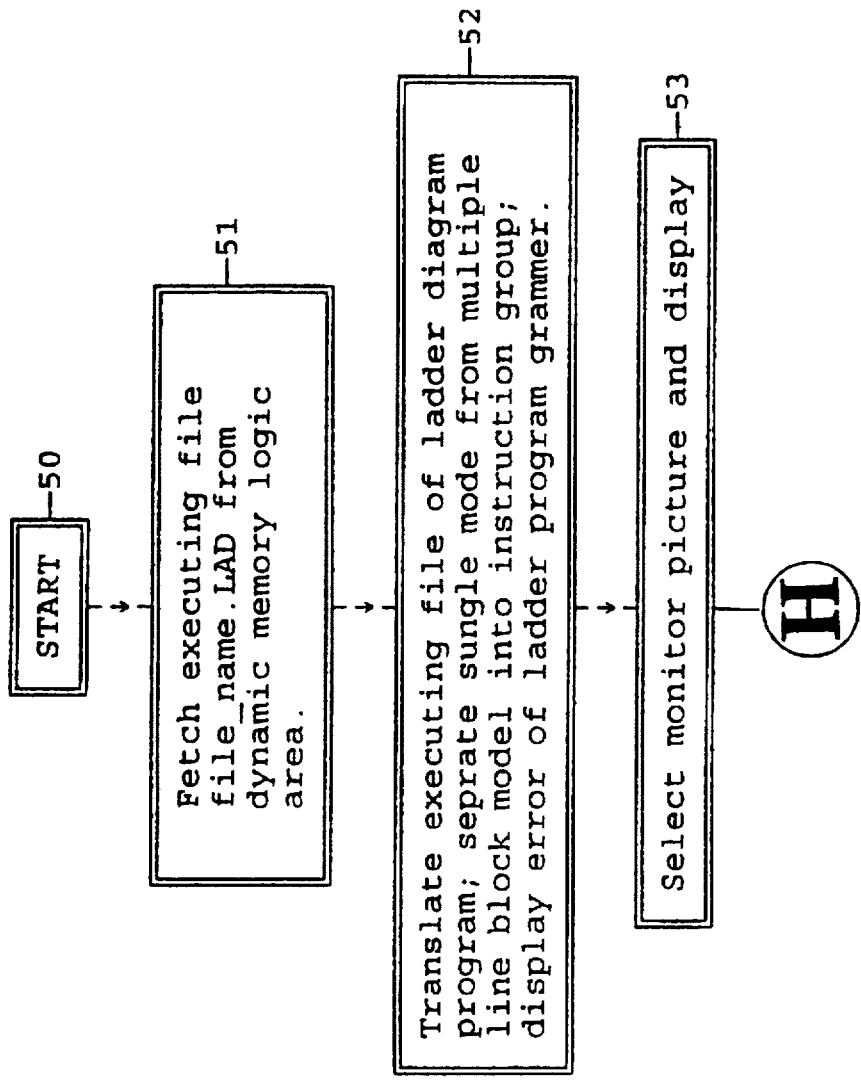
FIG. 5 is a block diagram illustrating the translation of the ladder program and the monitoring execution of the programmable controller.
Figure 5:
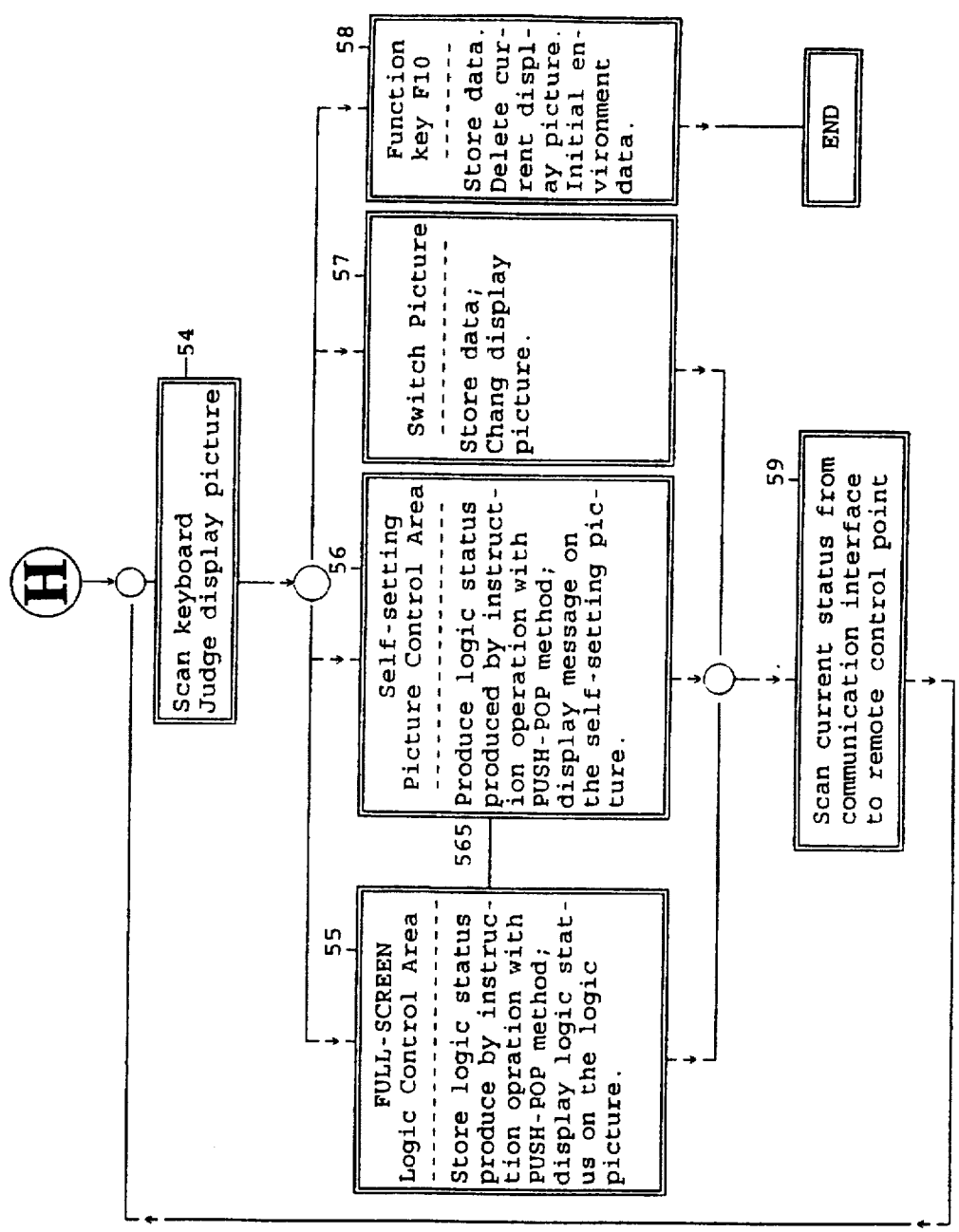
Figure 5A:
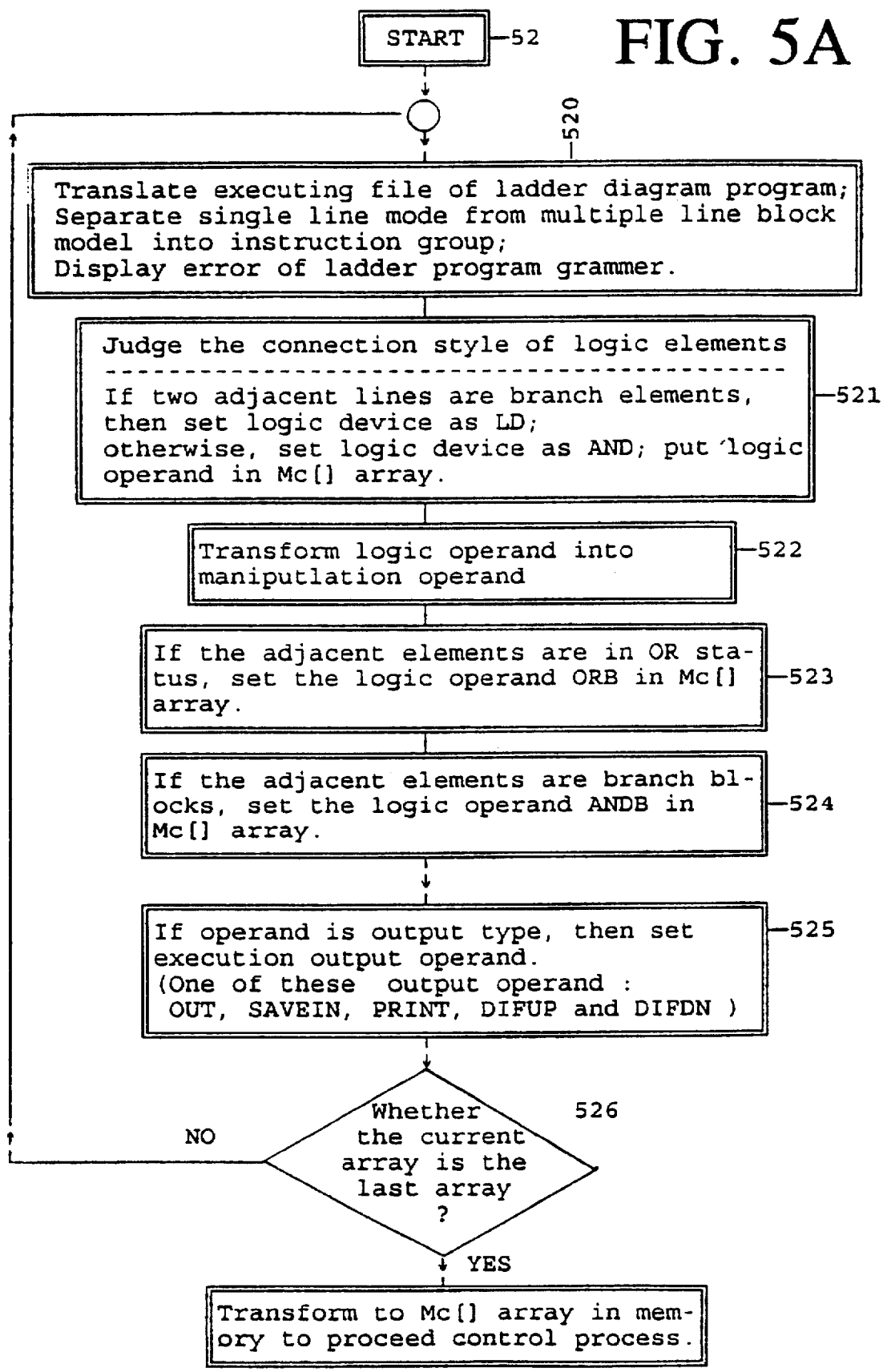
FIG. 5A is a flow chart showing the executive file of the translation of the ladder program.
Figure 8A:
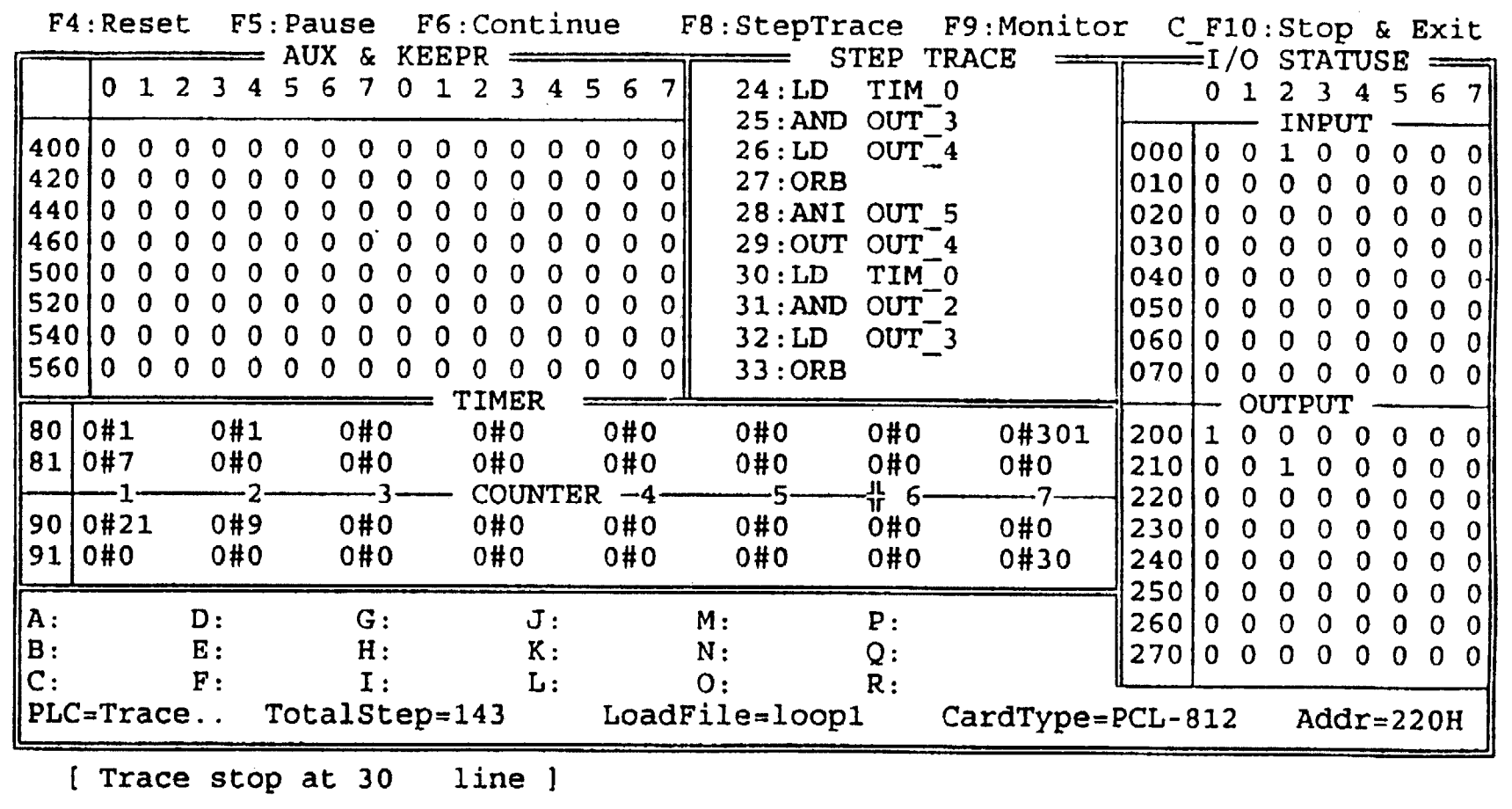

FIG. 5 is a block diagram illustrating the translation of the ladder diagram and the monitoring execution of the programmable controller. The flow chart begins from the entrance point 50, goes to checking and locating memory area 51 to fetch the ladder program file, goes to translating and checking ladder program grammar 52, goes to display selected monitor picture 53, goes to keyboard function scanning and judging displayed picture 54, then goes to one of the four steps, namely, entering full-screen logic control area 55, self-setting picture control area 56, switching picture 57 and storing data and deleting displayed picture 58, and then goes to scanning the current status from communication interface to remote module control point 59 in order to renew the FLAG in the inner conditions as the conditions for the next cycle control. Step 55 executes the logic states of each instruction groups by the push-pop algorithm (as shown in FIG. 8A) as the judgement of output condition. Step 55 applies 0/1 to represent the condition of falsehood/ truth in order to display the condition of each point on the screen. Step 56 sets the active points (as shown in FIG. 8A) by the user. The user inputs the active points so that the program will display the active points on the right positions with the formula provided by the user. Step 57 switches the picture between full-screen logic control area 55 and self-setting picture control area 56.

FIG. 5A is a flow chart showing the executive file of the translation of the ladder program. The flow chart begins from the entrance step 52 to Step 520, Step 521, Step 522, Step 523, Step 524, Step 525 and then to Step 526 in order. If Step 526 is not the last array, then goes back to Step 520. If Step 526 is the last array, then goes to the last step which transforms to Mc[] array in the memory to proceed the control process (as shown in Step 53 of FIG. 5). Step 520 is a translating execution file for ladder program to separate single line model from multiple line model in order to check the grammar. Step 521 judges whether the styles of two adjacent lines are branch elements (such as . . . , and ); otherwise they are non-branch elements. The branch element is regarded as logic device represented by LD. The non-branch element is represented by AND. The logic operand LD or AND is placed in the Mc[] array. Step 522 transforms the logic operand LD or AND into a manipulation operand such as TIMER (timer), COUNTER (counter), OUTR (output point), INR (input point), AUX (auxiliary junction point), and KEEPR (keep junction point). If the connecting element is in OR status, Step 523 sets the logic device as an operation operand ORB and places the operation operand ORB in the Mc[] array. If the connecting element is a branch element, Step 524 sets the logic device as an operation operand ANDB and places the operation operand ANDB in the Mc[] array. Step 525 executes one of the output operation operand such as OUTR (output), SAVEIN (save in), PRINT (print), DIFUP (differential up) and DIFDN (differential down). Step 526 checks whether the current array is the last array.

FIG. 5B is a flow chart showing the push-pop algorithm control. Step 565 is the sub-step of Step 55 and Step 56 in FIG. 5. The flow chart goes from Step 565 to Step 566, to Step 567, to Step 568, and then to one of the four steps, namely, Step 569, Step 570, Step 571 and Step 572. Step 565 reads the FLAG of RAM-2 from the control card. Step 566 reads the next set of instruction from Mc[] array. Step 567 judges the type of the first operation operand to push the FLAG of the manipulation operand into PUSH_FG[] array in RAM-2. Step 568 judges whether the pointer of PUSH_FG[] array is 0. If the pointer of PUSH_FG[] array is 0, the FLAG is truth/falsehood and the operation operand is output. Step 569 judges whether the operation operand is one of OR, ORB, ORI, AND, ANI and ANB. If the operation operand is one of OR, ORB, ORI, AND, ANI and ANB, the FLAG of PUSH_FG[] array is operated and the current FLAG and the precedent FLAG execute AND operation. The result of the operation is placed in PUSH_FG[] array. Step 570 judges whether the operation operand is one of LD and LDI. If the operation operand is LD or LDI, LD or LDI is placed in PUSH_FG[] array. Step 571 judges whether the operation operand is OUT. If the operation operand is OUT, RAM-2 which has set FLAG therein outputs 0/1 to the input/output process control card of latch register 10 and to the output terminal 5. Step 572 judges whether the operation operand is one of SAVEIN (save in), PRINT (print), DIFUP (differential up) and DIFDN (differential down). If the operation operand is DIFUP and the truth condition presents, the rising edge outputs a pulse of cycle time. If the operation operand is DIFDN and the truth condition disappears, the falling edge outputs a pulse of cycle time. If the operation operand is PRINT and the truth condition presents, the predetermined data will be output to the printer. If the operation operand is SAVEIN and the truth condition presents, the predetermined data will be stored in the magnetic disk unit 3.

Figure 6:
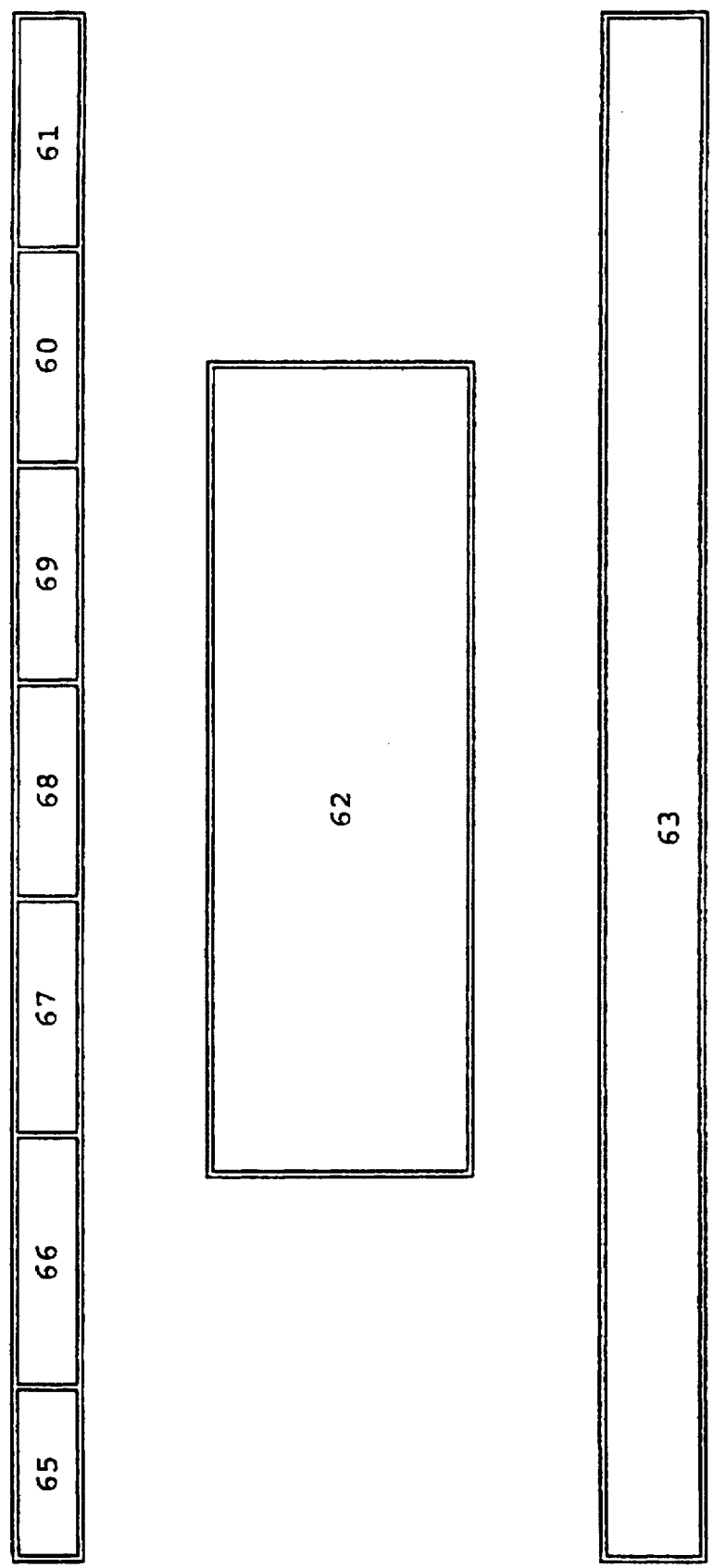
FIG. 6 is a schematic view showing the hardware setting integrated module on the screen.
Figure 6A:
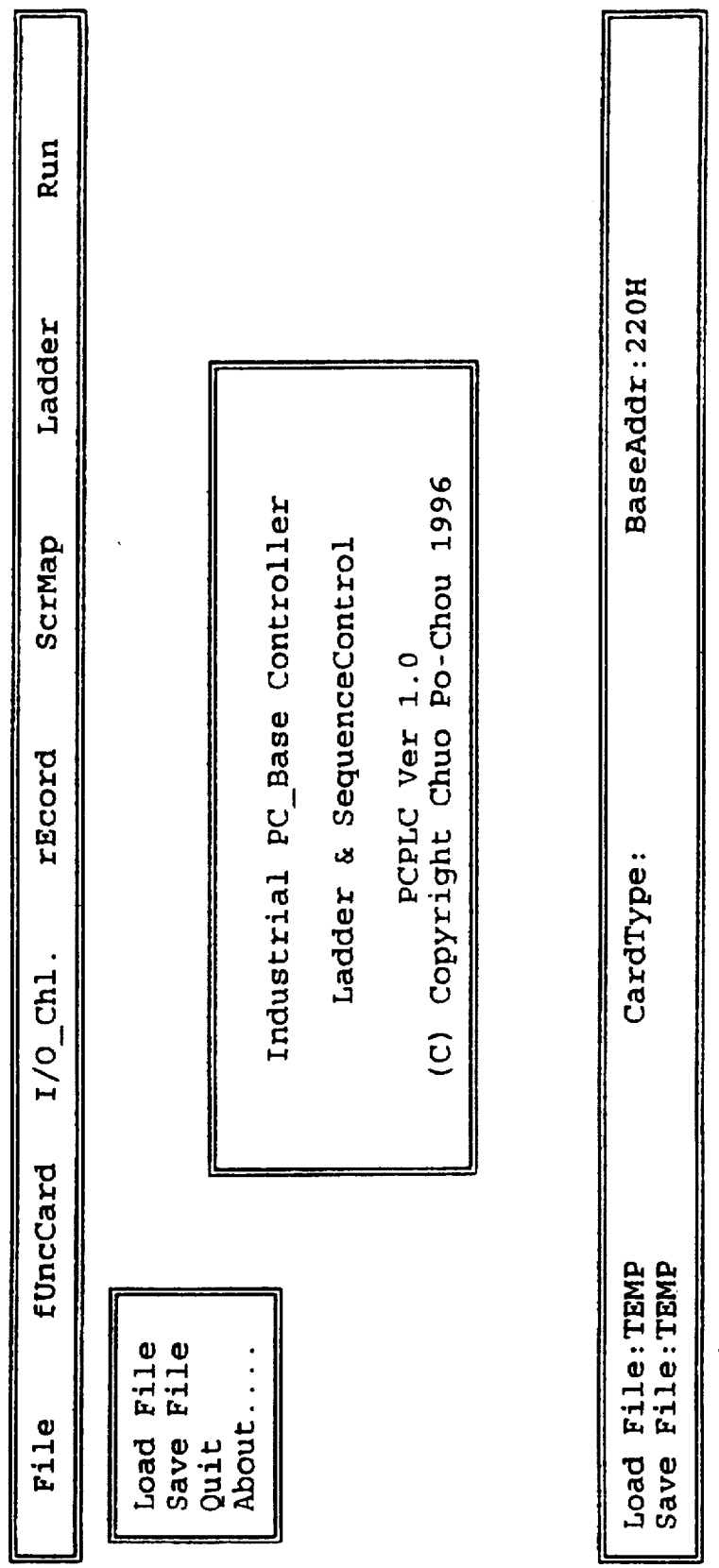
FIG. 6A is a schematic view showing the file management of programmable translation module on the screen.

FIG. 6 is a schematic view showing the hardware setting integrated module on the screen. FIG. 6A is a schematic view showing programmable translation module of the file management on the screen. FIG. 6B is a schematic view showing I/O address setting and selecting interface card of programmable translation module.

The steps of FIG. 6 are described as follows.

The magnetic disk unit 3 can initiate the program and read the executing instruction into RAM-1.

Numeral 67 represents setting the I/O address for a control card. Numeral 66 represents selecting the type of I/O control card and initiating the output/input model of the I/O control card. Numeral 65 represents that the control parameters are stored in the magnetic disk unit 3 with a new file name. Numeral 60 represents an editor which operates the ladder control operation. The data of the ladder control operation can be pre-stored in the magnetic disk unit 3 or programmed in the ROM 14.

The user can proceed with the ladder control design according to the flow chart showing the control steps of the ladder diagram in FIG. 4. As shown in FIG. 4A, the element editing function has normal open (⊢ ⊢), normal close (⊣/⊢) and DASH (-) functions. The DASH function is operated by OR algorithm to connect two adjacent elements and to arrange the cursor position on the connecting elements (such as —, I, T, ⊢, =, ⊣, L, ⊥, and ⌋). The output operand is represented by OUTR (output point). After the element editing function 46 (as shown in FIG. 4A) is finished, the ladder diagram program is stored in the Src[] array in RAM-2.

The ladder diagram program is stored in the magnetic disk unit 3 through CPU 11.

The ladder diagram program is printed by the printer 4.

Figure 7A:
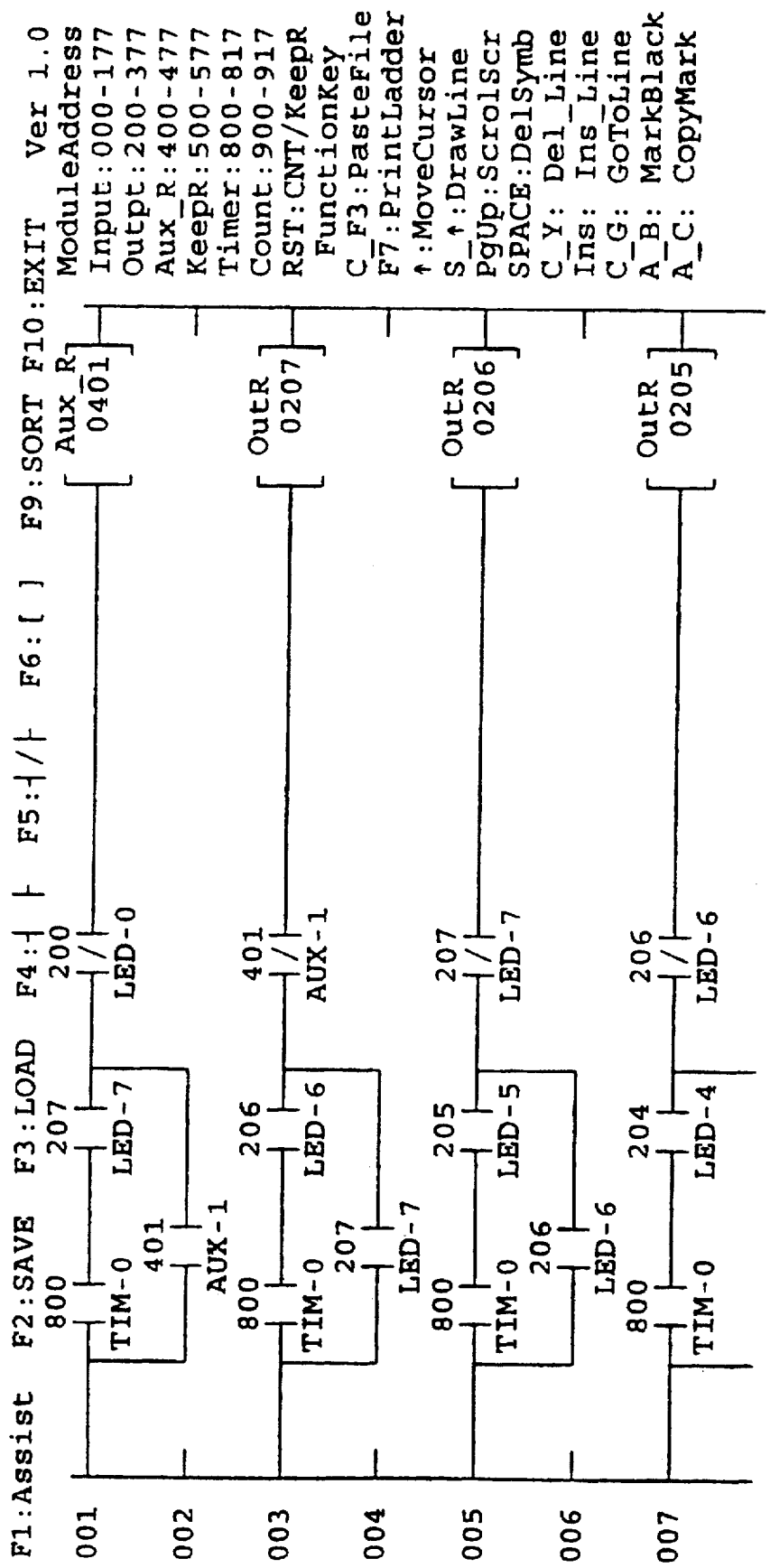
FIG. 7A is an editing chart showing the ladder control operation procedure.

Numeral 61 represents two steps of executing programmable translating module as follows. The first step is to pre-store the data of the programmable translating module in the magnetic disk unit 3 or to program the data of the programmable translating module in the ROM 14. The second step is to provide mnemonic instruction group for translating the ladder diagram program. The mnemonic instruction group comprises the manipulation operand such as TIMER (timer), COUNTER (counter), OUTR (output point), INR (input point), AUX (auxiliary junction point) and KEEPR (keep junction point), the operation operand such as OUTR (output), SAVEIN (save in), PRINT (print), DIFUP (differential up), DIFDN (differential down), LD (loading), LDI (inverse loading), AND, ANDI (NAND), OR, ORI(NOR), ANDB (AND block) and ORB (OR block), the branch elements and the branch blocks. The branch block is the ladder diagram program which is formed by the predetermined branch elements (such as —, I, T, ⊢, =, ⊣, L, ⊥, and ⌋). Referring to FIG. 7A, the block between 001 array and 002 array is formed by the branch elements 800, 401 and 207. The block between 003 array and 004 array is formed by the branch elements 800, 207 and 206. The block between 005 array and 006 array is formed by the branch elements 800, 206 and 205.

FIG. 7 is a block diagram illustrating ladder control operation. FIG. 7A is an editing chart showing the ladder control operation procedure.

The conversion from the Src[] structural variables in the memory to the Mc[] array variables in the memory has the following steps.

Read, judge, set, output and display the programmable control module from the Mc[] array variables in the memory RAM-2 in cycle.

Execute Step 54 to Step 59 in FIG. 5 so that the operation of the programmable control process can be performed by the user.

Operate the programmable control process in order by the push-pop algorithm method through Step 55 and Step 56 in FIG. 5. The push-pop algorithm method is shown in FIG. 5B. Read, judge, set and output the data in the memory RAM-2 in cycle. Read the FLAG in RAM-2, and read the next set of instructions in Mc[] array. Judge the type of the first operand, and input the current FLAG in PUSH_FG[] array in RAM-2. When the pointer of PUSH_FG[] is 0 and the FLAG is truth/falsehood, the operation operand is output.

The result of FIG. 7 is stored, and the program enters the "Run" model to display the pictures of FIGS. 8 and 8A. The instruction algorithm from the ladder translation displays on the window 80 in cycle. The user can trace the operation of the tested program and the executing result step by step. Window 88 guides the user to use the command model. The input/output virtual contact display area of the control system has non-memory virtual contacts (or inner general auxiliary contacts) 89 which is the same as AUX in FIG. 7A and memory virtual contacts (or inner keeper auxiliary contacts) which can keep the original logic state after the power is turned off. Each input state of the real input point display area 81 has an eight point input unit which has 8 bits equal to 1 byte. The codes 0–7, 10–17, 20–27 etc. have corresponding real addresses in I/O_Ch1. of FIG. 6B which is set in 67 of FIG. 6. If a single interface card is set, the real address will be set automatically. If more than two interface cards are used or the real address is special, the user has to adjust the real input point display area 81. The user can monitor the real input point display area 81 to understand the input status of the real contacts of the wiring diagram. The virtual time relay contact area 82 is the TIMER area. As shown in FIG. 8A, Numeral 80 represents the addresses from 800 to 807. Numeral 81 represents the addresses from 810 to 817. The TIMER of the system is an ON DELAY type timer which uses 0.1 second as the time unit. The address 800 displays 0#1 in which 0 represents TIMER_0 in the OFF state and 1 means the residual time is 0.1 second. The address 810 displays 0#7 in which 0 represents TIMER_0 in the OFF state and 7 means the residual time is 0.7 second. When the residual time is zero, the 0 in 0#1 and 0#7 becomes 1 which represents TIMER_1 in the ON state. The COUNTER area 83 counts how many times the events occur. Numeral 90 represents the addresses from 900 to 907. Numeral 91 represents the addresses from 910 to 917. The address 900 displays 0#21 in which 0 represents COUNTER_0 in the OFF state and 21 means 21 counters are stacked in the current CHANNEL. When the number of counter is zero, the 0 in 0#21 becomes 1 which represents COUNTER__1 in the ON state. The real contact output state display area 84 has 1=ON and 0=OFF. The user can monitor the real working status of the real working control points from the real contact output state display area 84. The OUTPUT area on FIG. 8A which corresponds to the real contact output state display area 84 on FIG. 8 has numerals 200 to 270. Numeral 200 represents the addresses from 200 to 207 according to the corresponding address of the interface card. Numeral 210 represents the addresses from 210 to 217 according to the corresponding address of the interface card. The customer designed display picture 85 has screen mapping to facilitate the user to enter any special picture predetermined by the special file name. The user can touch Ctrl__U on the keyboard to enter the special picture very fast so that the user can react to any special event quickly. Numeral 86 displays the message of the relative environment corresponding to the current executing program so that the user can find whether the parameters are correct. Numeral 87 displays the current status of the operating system so that the user can find whether the operating system is normal.

The present invention provides a programmable logic controller (PLC) with personal computerized ladder diagram without using high level computer languages nor using special writing machines to write the conventional PLC program. Further, the present invention provides real-time data file storage on the screen.

The present invention has the functions of editing ladder diagram, translating ladder diagram to operation operands and manipulation operands, executing the operand instructions automatically, executing the functions of programmable controller, monitoring, displaying, storing and printing in real time.

I claim:

1. A programmable logic controller (PLC) with personal computerized ladder diagram comprising:
    a keyboard,
    a display monitor,
    a magnetic disk unit,
    a printer,
    an output terminal,
    an input terminal,
    an interface card of temporary storage data display,
    a floppy disk/hard disk control card of latch register,
    a CPU (central processing unit),
    a RAM-1 (random access memory of storing executive module),
    a RAM-2 (random access memory of storing operation variables),
    a ROM (read only memory),
    a ladder diagram editing module,
    a ladder program translation and PLC monitoring module,
    an instruction algorithm control module and a hardware setting integrated module;
    wherein an input terminal of said input/output process control card of latch register connecting digital electronic signal elements and analog electronic signal elements through an OPTO ARRAY CKT (optoelectronic coupling array circuit),
    an output terminal of said input/output process control card of latch register connecting relays, coupling power circuit and analog signal control devices through said OPTO ARRAY CKT (optoelectronic coupling array circuit), said ladder program translation and PLC monitoring module including a push-pop algorithm program for reading a FLAG of said RAM-2 (random access memory of storing operation variables) from a control card, reading a next set of instruction, judging a type of the first operation operand to push said FLAG of manipulation operand into a PUSH__FG[] array in said RAM-2, judging whether a pointer of said PUSH__ FG[] array being 0 then outputting said operation operand, judging whether said operation operand being one of OR, ORB, ORI, AND, ANI and ANB, if said operation operand being one of OR, ORB, ORI, AND, ANI and ANB, then said FLAG of said PUSH__FG[] array operated and a current FLAG and a precedent FLAG executing AND operation, a result of operation placed in said PUSH__FG[] array, judging whether said operation operand is one of LD and LDI, if said operation operand being one of LD and LDI, placing said LD and LDI in said PUSH__FG[] array, judging whether said operation operand is OUT, if said operation operand being OUT, outputting 0/1 to said input/ output process control card of latch register and then to said output terminal from said RAM-2 which has said set FLAG therein and executing next operation operand and outputting a next result until a cycle time is finished;
    whereby data of said ladder diagram editing module and said ladder program translation module being pre-stored in said magnetic disk unit to edit said ladder diagram and to translate said ladder program into an instruction algorithm to edit, translate, execute, control, input/output, print, display, monitor and store file in run time,
    said hardware setting integrated module becoming an integrated window for setting hardware environment and executing said PLC and editing said ladder diagram,
    said ladder diagram editing module producing an edition file for said ladder program translation and PLC monitoring module, and
    said ladder program translation and PLC control module setting a file to enter an executing monitor point data of a PLC program to show a display monitor environment.

2. A programmable logic controller (PLC) with personal computerized ladder diagram as claimed in claim 1, wherein Src[] structural variables in said RAM-2 convert to Mc[] array variables in said RAM-2 to read, judge, set, output and display a programmable control module from said Mc[] array variables in said RAM-2 in cycle.

3. A programmable logic controller (PLC) with personal computerized ladder diagram as claimed in claim 2, wherein said reading, judging, setting, outputting and displaying comprises the steps of:
    keyboard scanning and judging displayed picture, entering a full-screen logic control area, a self-setting picture control area, switching picture and storing data and deleting displayed picture, and scanning the status from a communication interface to a remote module control point to renew said FLAG in inner conditions as the conditions for the next cycle control;
    reading said FLAG in said RAM-2, and reading the next set of instructions in said Mc[] array by said push-pop algorithm method, judging the type of the first operand, and input the current FLAG in an PUSH__FG[] array in said RAM-2; and
    wherein a pointer of said PUSH__FG[] is 0 and said FLAG is truth/falsehood, then outputs the operation operand.

4. A computerized ladder diagram control system for a programmable logic controller (PLC) comprising the steps of:

initiating a program and reading an executing instruction from a magnetic disk unit into a RAM-1 (random access memory of storing executive module);

setting an address for a control card;

initiating an output/input model of said control card, storing control parameters in said magnetic disk unit with a new file name;

operating a ladder control operation with an editor, pre-storing data of said ladder control operation in said magnetic disk unit;

proceeding a ladder control design according to a flow chart showing control steps of said ladder diagram;

storing a ladder diagram program in an Src[] array in a RAM-2 (random access memory of storing operation variables) through an element editing program;

storing said ladder diagram program in said magnetic disk unit as a ladder program file through a CPU (central processing unit);

printing said ladder diagram program by a printer;

translating said ladder diagram program and monitoring said PLC; and wherein ladder diagram translation and PLC monitoring process include the steps of:

checking and locating a memory area to fetch said ladder program file, translating and checking ladder program grammar, displaying a selected monitor picture, scanning a keyboard function and judging said displayed picture, then going to one of the four steps, namely, entering a full-screen logic control area, a self-setting picture control area, switching picture and storing data and deleting said displayed picture, and then going to scanning the status from a communication interface to a remote module control point in order to renew a FLAG in inner conditions as the conditions for the next cycle control, executing the logic states of each instruction group by a push-pop algorithm as a judgment of output condition, applying 0/1 to represent the condition of falsehood/truth in order to display the condition of each point on the screen, setting active points, inputting said active points so that said active points will be displayed, and switching pictures between said full-screen logic control area and said self-setting picture control area.

* * * * *